US011689483B2

(12) United States Patent
Matta et al.

(10) Patent No.: US 11,689,483 B2
(45) Date of Patent: *Jun. 27, 2023

(54) APPARATUS AND METHOD FOR RELATIVISTIC EVENT PERCEPTION PREDICTION AND CONTENT CREATION

(71) Applicant: ASSURANT, INC., New York, NY (US)

(72) Inventors: Rajiv Matta, Atlanta, GA (US); Ron Brusky, Miami, FL (US)

(73) Assignee: Assurant, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,640

(22) Filed: Mar. 16, 2022

(65) Prior Publication Data

US 2022/0353212 A1   Nov. 3, 2022

Related U.S. Application Data

(63) Continuation of application No. 16/992,470, filed on Aug. 13, 2020, now Pat. No. 11,310,175, which is a continuation of application No. 15/982,371, filed on May 17, 2018, now Pat. No. 10,778,615.

(60) Provisional application No. 62/508,090, filed on May 18, 2017.

(51) Int. Cl.
| G06F 15/16 | (2006.01) |
| H04L 51/02 | (2022.01) |
| G06N 7/00 | (2023.01) |
| H04L 67/306 | (2022.01) |
| G06N 20/00 | (2019.01) |
| H04L 51/222 | (2022.01) |

(Continued)

(52) U.S. Cl.
CPC ............... H04L 51/02 (2013.01); G06N 7/00 (2013.01); G06N 20/00 (2019.01); H04L 51/222 (2022.05); H04L 67/306 (2013.01); H04L 67/535 (2022.05); H04L 67/02 (2013.01)

(58) Field of Classification Search
CPC ......... H04L 51/02; H04L 67/306; G06N 7/00; G06N 20/00
USPC .......................................................... 709/206
See application file for complete search history.

(56) References Cited

U.S. PATENT DOCUMENTS

| 10,540,607 B1 * | 1/2020 | Oldridge ................ G06N 20/00 |
| 2006/0002532 A1 * | 1/2006 | Horvitz ............... H04L 41/5022 379/112.01 |
| 2012/0190432 A1 | 7/2012 | Nathanson |

(Continued)

OTHER PUBLICATIONS

U.S. Appl. No. 16/992,470, filed Aug. 13, 2020, U.S. Pat. No. 11,310,175, Issued.

(Continued)

*Primary Examiner* — Lan Dai T Truong
(74) *Attorney, Agent, or Firm* — Alston & Bird LLP

(57) ABSTRACT

An apparatus, method, and computer program product are provided for the improved and automatic prediction of a relativistic, observer-specific perception and response to a potential event and, based at least in part on the predicted perception and response, generating and presenting observer-specific digital content items. Some example implementations employ predictive, machine-learning modeling to facilitate user-specific event perception and response prediction and the selection of particularized messages and other digital content items for presentation to the user.

20 Claims, 5 Drawing Sheets

(51) Int. Cl.
*H04L 67/50* (2022.01)
*H04L 67/02* (2022.01)

(56) References Cited

U.S. PATENT DOCUMENTS

| | | |
|---|---|---|
| 2014/0244744 A1 | 8/2014 | Lyren |
| 2015/0309962 A1 | 10/2015 | Lichman et al. |
| 2016/0127534 A1 | 5/2016 | Celik et al. |
| 2017/0068906 A1 | 3/2017 | Korycki et al. |
| 2017/0185903 A1 | 6/2017 | Bernhardt |
| 2018/0276974 A1 | 9/2018 | Talty et al. |
| 2018/0288063 A1 | 10/2018 | Koottayi et al. |
| 2018/0330258 A1 | 11/2018 | Harris et al. |
| 2019/0268065 A1 | 8/2019 | Law et al. |

OTHER PUBLICATIONS

U.S. Appl. No. 15/982,371, filed May 17, 2018, U.S. Pat. No. 10,778,615, Issued.

\* cited by examiner

APPARATUS AND METHOD FOR RELATIVISTIC EVENT PERCEPTION PREDICTION AND CONTENT CREATION

CROSS REFERENCE TO RELATED APPLICATIONS

This application is a continuation of U.S. application Ser. No. 16/992,470, filed Aug. 13, 2020 and entitled "Apparatus and Method For Relativistic Event Perception Prediction and Content Creation," which claims the benefit of U.S. application Ser. No. 15/982,371, filed May 17, 2018 and entitled "Apparatus and Method For Relativistic Event Perception Prediction and Content Creation" (now U.S. Pat. No. 10,778,615), which claims the benefit of U.S. Provisional Application No. 62/508,090 filed May 18, 2017 and entitled "Apparatus and Method For Relativistic Event Perception Prediction and Content Creation," which applications are each hereby incorporated by reference in their entireties.

TECHNICAL FIELD

An example embodiment relates generally to machine learning systems, particularly in the context of predicting and modeling relativistic event perception and the responsive, automatic generation and presentation of observer-specific digital content. Example implementations are particularly directed to systems, methods, and apparatuses for generating selectable data objects and associated natural language digital content based on a modeled and predicted, observer-specific response to stimuli associated with one or more potential events.

BACKGROUND

The effective preparation for potentially catastrophic events, such as storms and other natural disasters, infrastructure failure, and other casualties has challenged individuals and the collective population for centuries. Some of the technical challenges that hinder effective preparation efforts involve the difficulties in predicting how individuals within a given population will perceive and react to relatively rare events and the difficulty in communicating targeted information and other content to multiple individuals who are likely to respond to such events and information in widely divergent ways. The inventors of the invention disclosed herein have identified these and other technical challenges, and developed the solutions described and otherwise referenced herein.

BRIEF SUMMARY

An apparatus, computer program product, and method are therefore provided in accordance with an example embodiment in order permit the efficient prediction of a user-specific, relativistic perception of one or more events and the generation of digital content item sets based at least in part on the predicted perception. In this regard, the method, apparatus and computer program product of an example embodiment provide for the creation of renderable digital content item sets through the collection of user-related data objects and the application of such data objects to a machine learning model to determine a predicted relativistic perception. Moreover, the method, apparatus, and computer program product of an example embodiment provide for use of the machine learning model in connection with the selection and/or generation of user-specific digital content item sets that may be presented as renderable objects in response to received queries from a user.

In an example embodiment, an apparatus is provided, the apparatus comprising a processor and a memory, the memory comprising instructions that configure the apparatus to: receive a message request data object from a client device associated with a user; extract, from the message request data object, a user identification data set and a request data set; receive a user context data object, wherein the user context data object is associated with the user identification data set; receive an event probability data object, wherein the user context data object is associated with the user identification data set; receive an event perception data object, wherein the event perception data object is associated with the user identification data set; retrieve a user-specific digital content item set, wherein retrieving the user-specific digital content item set comprises applying the user context data object, the event probability data object, and the event perception data object to a first model; and generate a control signal causing a renderable object comprising the user-specific digital content item set to be displayed on a user interface of the client device associated with the user.

In some example implementations of such an apparatus, the user identification data set comprises an authenticated indication of the identity of the user. In some such example implementations, and in other example implementations, the user context data object comprises a geographic parameter set, wherein the geographic parameter set comprises an indication of a user-specific geographic location; a user history parameter set, wherein the user history parameter set comprises a set of data associated with prior interactions between the user and an entity associated with the apparatus; and a user biographical parameter set, wherein the user biographical parameter set comprises a set of traits that are each associated with the user. In some such example implementations, and in other example implementations, the event probability data object comprises a set of indications of a plurality of potential events and a set of probabilities of the occurrence of each potential event within the plurality of potential events. In some such example implementations, and in other example implementations, the event perception data object comprises a user-specific event perception profile based at least in apart on a user-generated content set and a user behavior set.

In some example implementations of an apparatus in accordance with this embodiment, the user-specific digital content item set comprises a first user-specific message and a first user-selectable option set. In some such example implementations, and in other example implementations, retrieving a user-specific digital content item set comprises generating, by the first model, a learned user profile; applying the learned user profile to a plurality of potential messages; selecting the first user-specific message from the plurality of potential messages; applying the learned user profile to a plurality of user-selectable options; selecting the first user-selectable option set from among a plurality of user-selectable options; and assigning the first user-specific message and the first user-selectable option set to the user-specific digital content item set. In some such example implementations, and in other example implementations, generating the learned user profile comprises a user-specific expected response set based at least in part on the user context data object, the event probability data object, and the event perception data object. In some such example implementations, and in other example implementations, the first model is a machine learning model.

In another example embodiment, a computer program product is provided, the computer program product comprising at least one non-transitory computer-readable storage medium having computer-executable program code instructions stored therein, the computer-executable program code instructions comprising program code instructions configured to: receive a message request data object from a client device associated with a user; extract, from the message request data object, a user identification data set and a request data set; receive a user context data object, wherein the user context data object is associated with the user identification data set; receive an event probability data object, wherein the user context data object is associated with the user identification data set; receive an event perception data object, wherein the event perception data object is associated with the user identification data set; retrieve a user-specific digital content item set, wherein retrieving the user-specific digital content item set comprises applying the user context data object, the event probability data object, and the event perception data object to a first model; and generate a control signal causing a renderable object comprising the user-specific digital content item set to be displayed on a user interface of the client device associated with the user.

In another example embodiment, a method for generating user-specific message content is provided, the method comprising: receiving a message request data object from a client device associated with a user; extracting, from the message request data object, a user identification data set and a request data set; receiving a user context data object, wherein the user context data object is associated with the user identification data set; receiving an event probability data object, wherein the user context data object is associated with the user identification data set; receiving an event perception data object, wherein the event perception data object is associated with the user identification data set; retrieving a user-specific digital content item set, wherein retrieving the user-specific digital content item set comprises applying the user context data object, the event probability data object, and the event perception data object to a first model; and generating a control signal causing a renderable object comprising the user-specific digital content item set to be displayed on a user interface of the client device associated with the user.

BRIEF DESCRIPTION OF THE DRAWINGS

Figure 1:
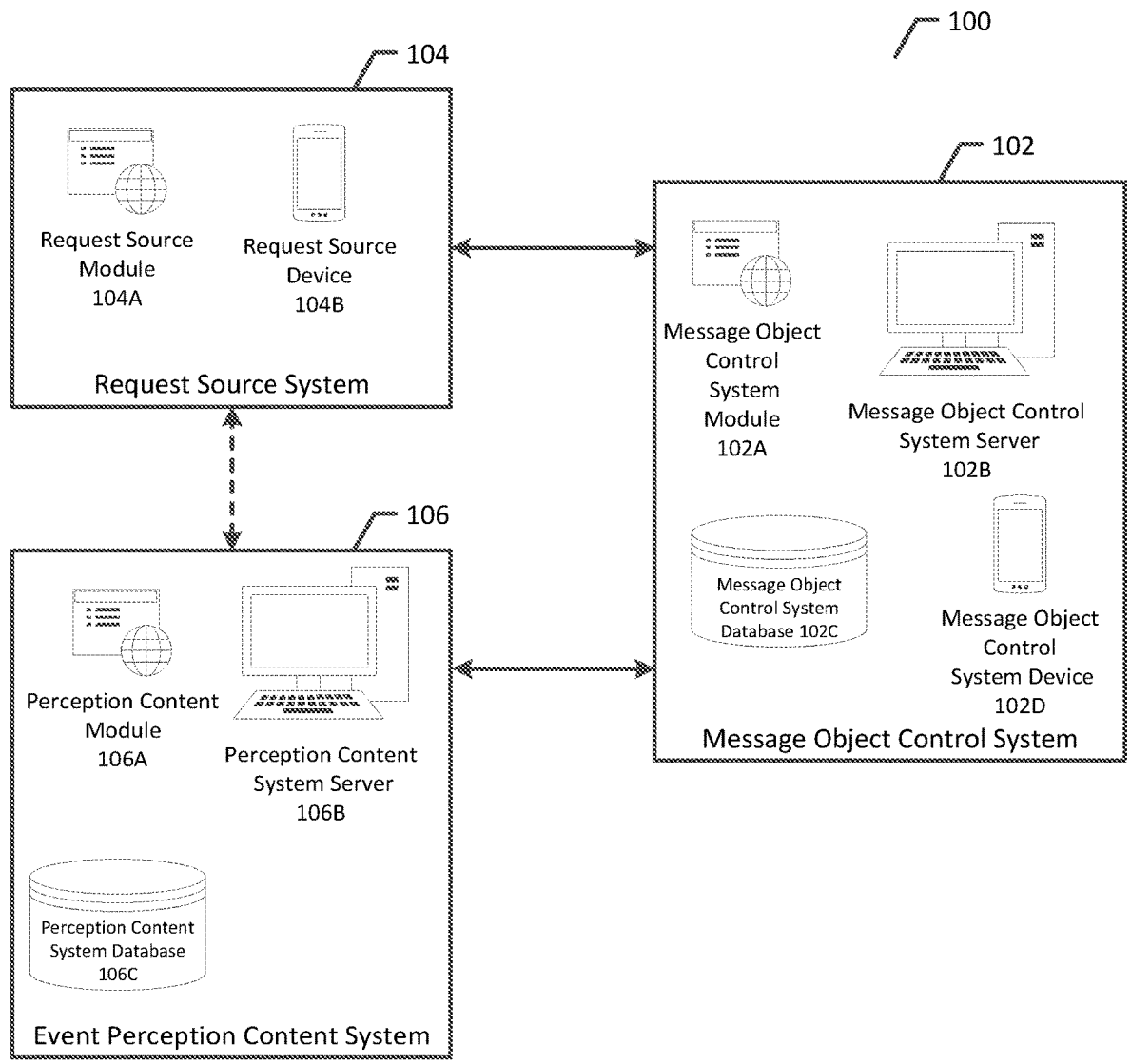
Figure 2:
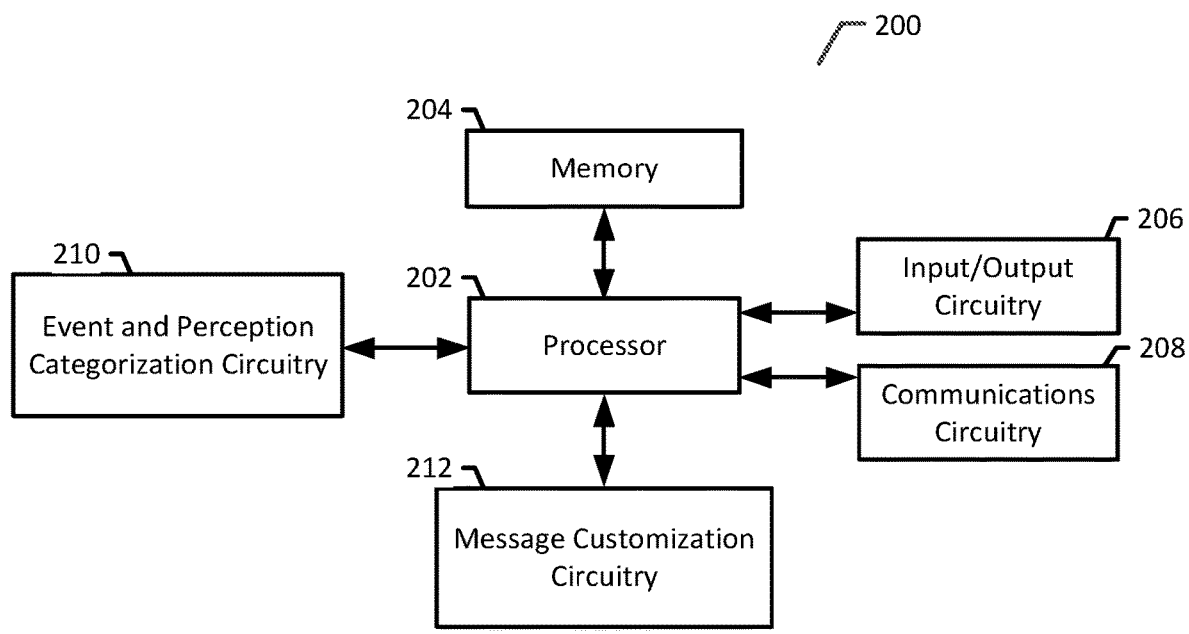
Figure 3:
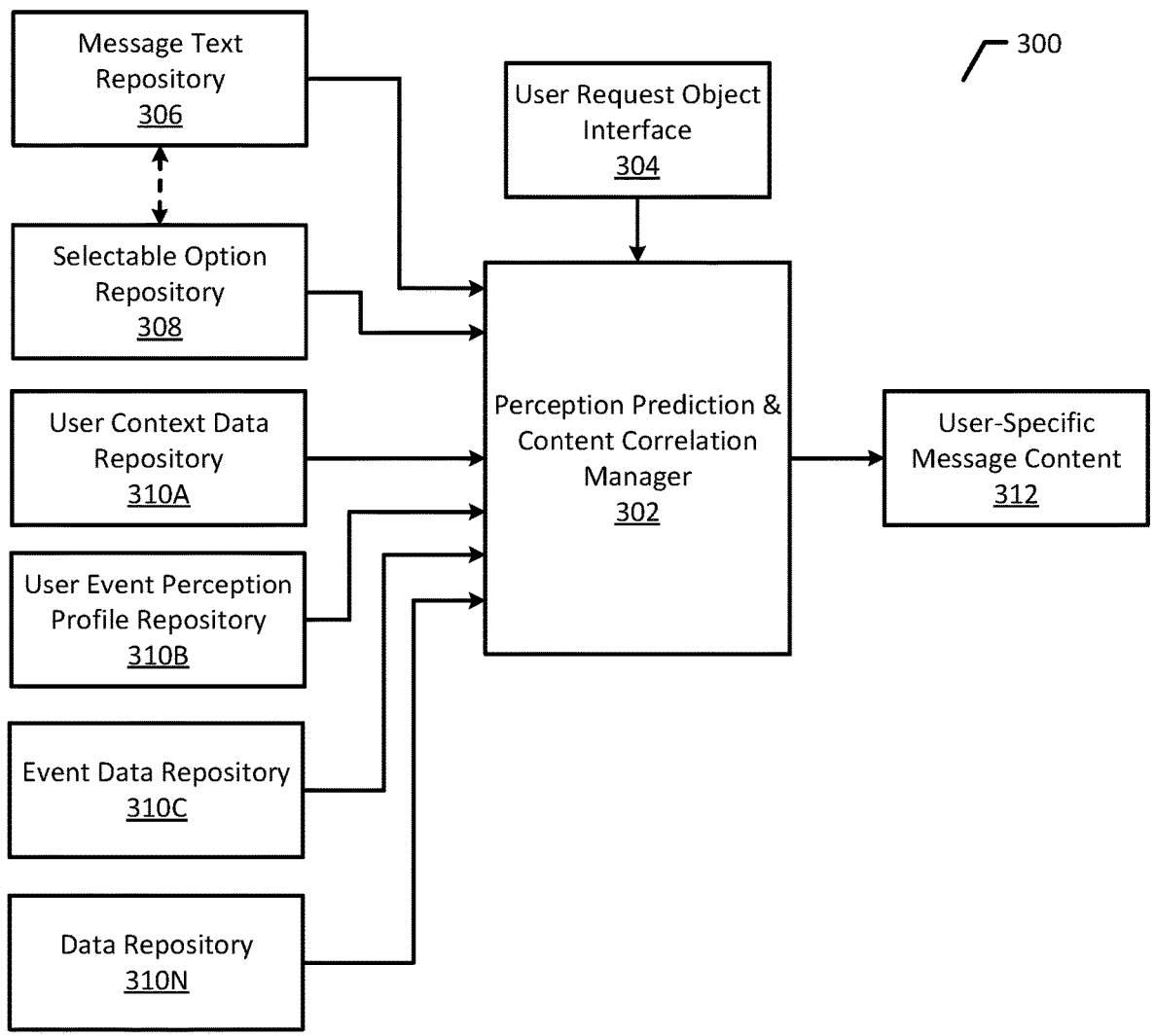
Figure 4A:
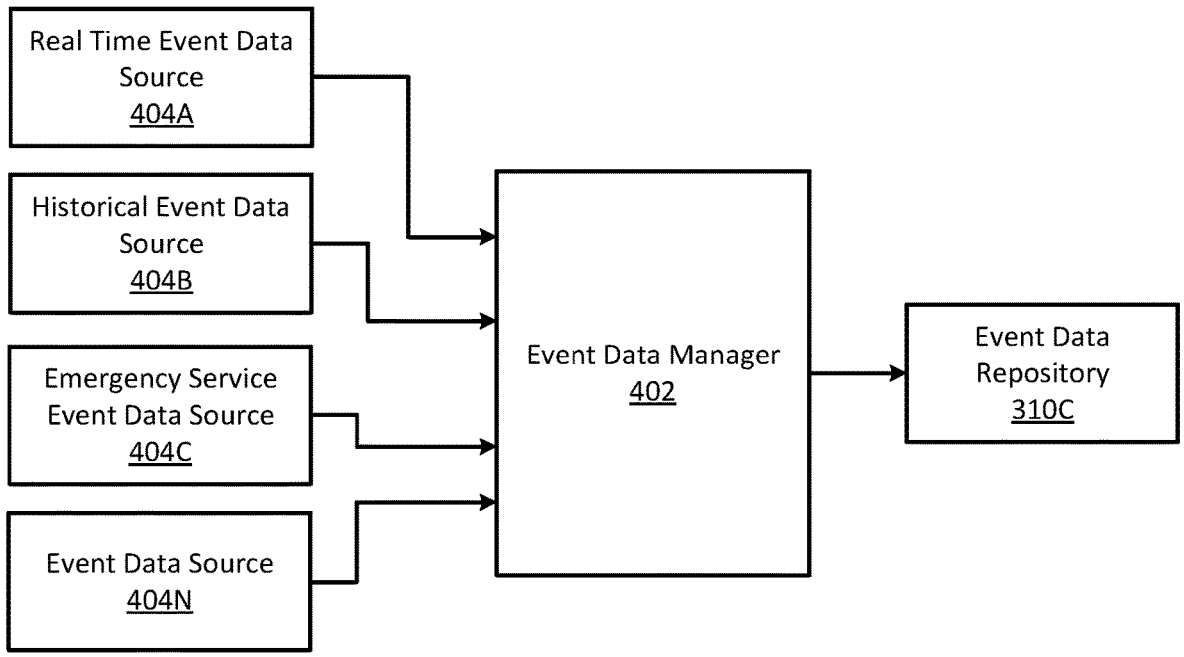
Figure 4B:
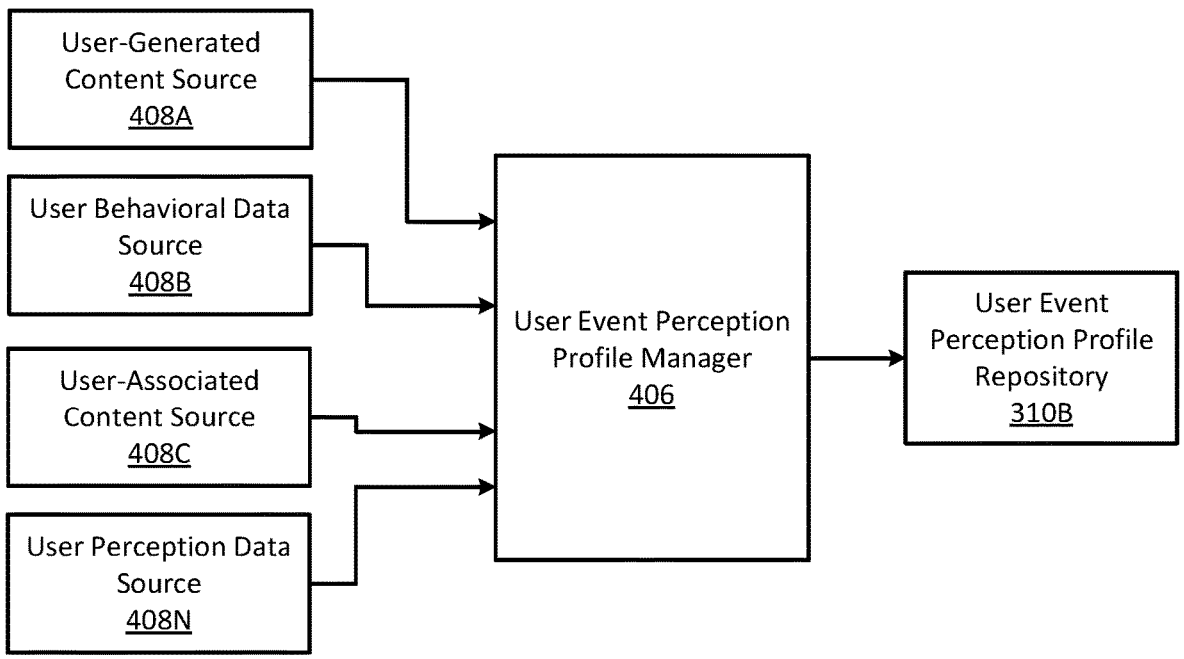
Figure 5:
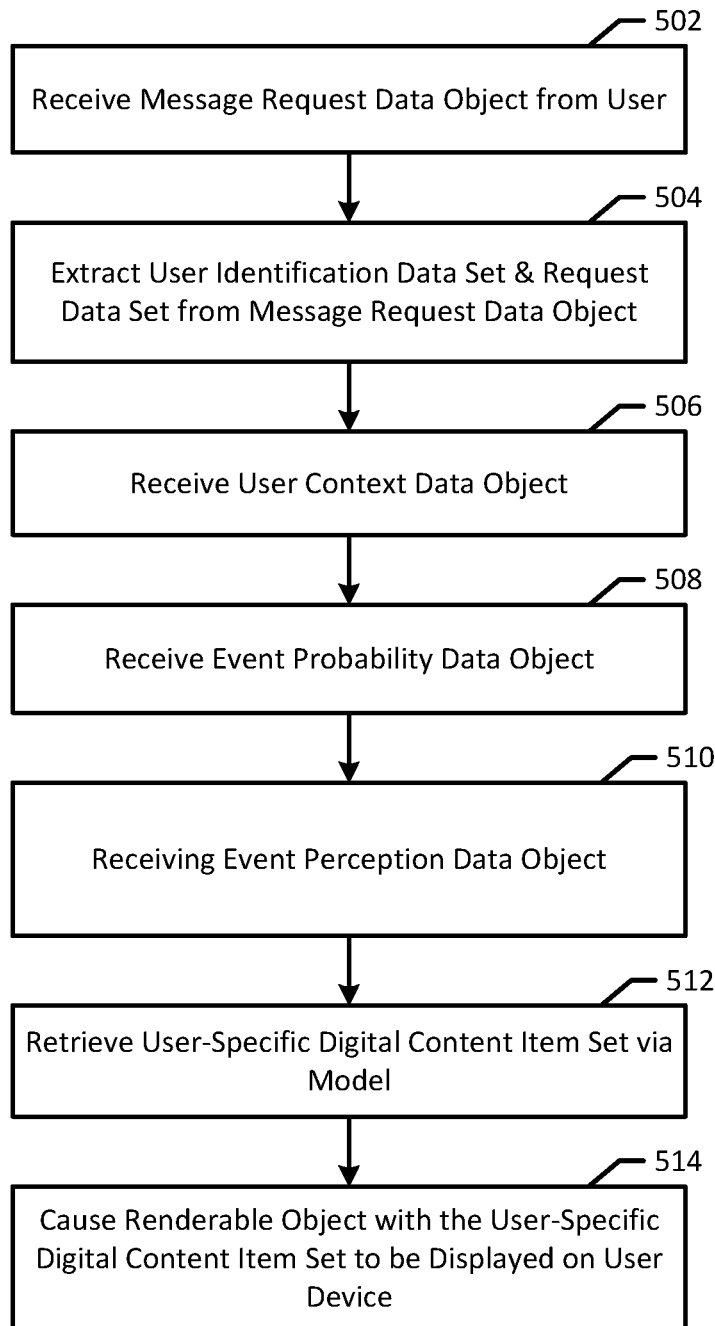

Having thus described certain embodiments of the present invention in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing a data object generation system using special-purpose circuitry in accordance with some embodiments of the present invention;

FIG. 3 illustrates an example data flow interaction between elements of an example device for generating digital content item sets based on a modeled prediction of a user's relativistic perception of a potential event in accordance with some embodiments of the present invention;

FIGS. 4a and 4b illustrate flowcharts describing example operations and configurations of elements that may be incorporated into the data flow presented in FIG. 3 in accordance with some embodiments of the present invention; and FIG. 5 illustrates a flowchart describing example operations for generating digital content item sets based on a modeled prediction of a user's relativistic perception of a potential event in accordance with some embodiments of the present invention in accordance with some embodiments of the present invention.

DETAILED DESCRIPTION

Some embodiments of the present invention will now be described more fully herein with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present invention are directed to improved apparatuses, methods, and computer readable media for predicting an observer-specific perception and response to a potential event and, based at least in part on the predicted perception and response, generating and presenting observer-specific digital content items. In this regard, embodiments of the present invention provide systems, devices, and frameworks that employ predictive, machine-learning modeling to facilitate user-specific event perception and response prediction and the selection of particularized messages and other digital content items for presentation to the user.

The inventors of the invention disclosed herein have discovered that an individual's perception of (and response to) a significant event is individualized and relativistic. In particular, each individual who experiences a particular event or class of event (such as a storm, other major weather event, natural disaster, infrastructure failure, property damage or destruction, injury, and/or other casualty, for example) perceives the severity and nature of the event and determines a response to the event in a highly individualized manner. Consequently, the selection of messages and other digital content regarding event preparedness and planning and communicating such content to an individual can be made more efficient and effective through the prediction and modeling of the individual's likely perception and response to one or more potential events. However, the individualized and relativistic nature of event perception and response imposes a number of technical challenges, particularly when attempting to predict and model user-specific perceptions and responses to events that are rare and/or significant (such as major flooding, severe storms, and/or other occurrences that tend to cause catastrophic losses, for example).

As recognized by the inventors of the invention disclosed herein, the technical challenges associated with predicting and modeling an individual's perception and response to an event are compounded by a wide range of information occlusion factors. Particularly in situations involving rare and/or significant events, there is rarely a meaningful historical record of an individual's previous responses to a given event or class of events. Moreover, a particular individual may not be able to accurately articulate their own likely perception and response to a given event, and an individual's planned and/or desired perception and response to a potential event may differ significantly from the individual's actual perception and behavior when experiencing an actual event. The difficulties associated with accurately predicting an individual's perception of and response to a given event often result in ineffective and inefficient communication with the individual, particularly with respect to communications involving event preparedness and planning.

Users associated with requests for messages and/or other content related to event preparedness and planning may be able to interact with a message object control system that uses a predictive, machine learning model. Through the use of a machine learning model, the system is able to identify, generate, and/or otherwise provide user-specific, targeted messaging and content to a user based on the user's likely perception and/or response to a given event and/or class of events. In predicting a user's perception of an event and likely response to the event, the system may draw from a range of information sources that can be supplied to the machine learning model. For example, the system may access and process user-specific information such as a user's biographical information, geographic location, activity patterns (including but not limited to Internet and/or social media activity patterns), and the like for use in connection with the machine learning model. The system may also access and process contextual and/or other non-user-specific information, such as historical event data, topographical and/or other geographic information, public records, other data sources, and the like for use in connection with the machine learning model.

Many of the example implementations described herein are particularly advantageous in situations and other contexts that involve event preparedness and planning. In some such situations, event preparedness and planning may include the presentation and/or offer to a user of information, resources and/or other services (such as additional and/or gap insurance coverage, for example) that may allow a user to recover from and/or otherwise address the consequences of an event. By modeling the user's likely perception of an event and/or class of events, the communications to the user may be rendered more effective and efficient. As such, and for purposes of clarity, some of the example implementations described herein use terms, background facts, and details that are associated with event preparedness and planning and may reference the presentation of information and selectable data objects associated with insurance coverage. However, it will be appreciated that embodiments of the invention and example implementations thereof may be applicable and advantageous in a broad range of contexts and situations outside of those related to event preparedness and planning.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "user", "client", and/or "request source" refer to an individual or entity that is a source, and/or is associated with sources, of a request for messages and/or related content to be provided by a message object control system and/or any other system capable of providing messages and/or related content to the individual and/or entity. For example, a user and/or client may be the owner and/or entity that seeks information and options associated with preparing and/or otherwise planning for one or more potential events.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "digital content item" refers to any electronic media content item that is intended to be used in either an electronic form or as printed output and which is may be received, processed, and/or otherwise accessible by a client device. A digital content item, for example, may be in the form of a text file conveying human-readable information to a user of a client device. Other digital content items include images, audio files, video files, text files, and the like.

The term "event" refers to any discernible action, instance, or occurrence. For example, an event may consist of a movement of an item, a storm, other major weather instance, natural disaster, infrastructure failure, property damage, destruction, injury, and/or other casualty. It will be appreciated that an event may be attributable to and/or the result of action by one or more individuals and/or entities, or may not be so attributable (such as in the case of natural and/or unexplained phenomena, for example).

As used herein the term "data object" refers to a structured arrangement of data. A "message request data object" is a data object that includes one or more sets of data associated with a request by a user for a message and/or other digital content items related to the requested message. A "user context data object" is a data object that includes one or more sets of data that alone or in combination provide information about a context in which a particular user (such as a user who has transmitted a message request data object, for example) resides and/or may be placed. An "event probability data object" is a data object that includes one or more data sets associated with the probability that one or more events may occur and/or cause a set of effects. An "event perception data object" is a data object that contains one or more sets of data containing, reflecting, and/or otherwise associated with indicia of how a user (such as a user associated with a message request data object, for example) may perceive and/or respond to one or more events and/or classes of events.

Example System Environment

Turning now to the Figures, FIG. 1 shows an example system environment 100 in which implementations involving the efficient prediction of a user's perception of an event and the communication to the user of a user-specific message and/or other digital content item set may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1 and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the prediction of a user's perception of one or more events and the generation of a user-specific digital content item set associated with the predicted perception by receiving and parsing a message request data object received from a user, retrieving and/or receiving a set of data objects to be presented to a machine learning model (such as a user context data object, event probability data object, and/or an event perception data object, for example), retrieving a user-specific digital content item set by applying the received data objects to a machine learning model, and generating a control signal causing a renderable object associated with the user-specific digital content item set to be displayed on a user interface of a client device associated with the user. Some such implementations contemplate the generation of a learned user profile based at least in part on the combining and/or other processing of the received data objects that can be updated to reflect and/or otherwise capture potential changes in how a given user may perceive and/or respond to the occurrence of a potential event and/or class of potential events. Some such embodiments leverage a hardware and software arrangement or environment for the user perception prediction and responsive message generation actions described, contemplated, and/or otherwise disclosed herein.

As shown in FIG. 1, a message object control system 102 includes an online message object control system module 102A which is configured to receive, process, transform, transmit, communicate with and evaluate message request data objects, user context data objects, event probability data object, event perception data objects, the content and other information associated with such data objects, and related interfaces via a web server, such as message object control system server 102B and/or message object control system device 102D. The message object control system server 102B and/or message object control system device 102D is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (such as network routers and network switches, for example). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, message object control system 102 also includes a message object control database 102C that may be used to store information associated with message request data objects, users associated with message request data objects, user context data objects, event probability data objects, event perception data objects, user-specific digital content item sets, interfaces associated with any such data objects, request source systems, event perception content systems, and/or any other information related to the prediction of a user-specific perception of a potential event and the generation of one or more user-specific digital content item sets. The message object control database 102C may be accessed by the message object control system module 102A, the message object control system server 102B, and/or the message object control system device 102D, and may be used to store any additional information accessed by and/or otherwise associated with the message object control system 102 and/or its component parts. While FIG. 1 depicts message object control system database 102C as a single structure, it will be appreciated that object control system database 102C may additionally or alternatively be implemented to allow for storage in a distributed fashion and/or at facilities that are physically remote from the each other and/or the other components of message object control system 102.

Message object control system 102 is also shown as including message object control system device 102D which may take the form of a laptop computer, desktop computer, or mobile device, for example, to provide an additional means (other than via a user interface of the message object control system server 102B) to interface with the other components of message object control system 102 and/or other components shown in or otherwise contemplated by system environment 100.

Message request data objects, message request data object information and/or additional content or other information to be associated with one or more message request data objects may originate from a request source system such as request source system 104. A user of request source system 104 may use a request source device 104B, such as a laptop computer, desktop computer, or mobile device, for example, to interface with a request source module 104A to create, generate, and/or convey a request message data object and/or information to be included in a message request data object, such as a user identification data set and/or a request data set. The request source system 104 may (such as through the operation of the request source module 104A and/or the request source device 104B, for example) transmit a message request data object to the message object control system 102. While only one request source system 104 is depicted in FIG. 1 in the interest of clarity, it will be appreciated that numerous other such systems may be present in system environment 100, permitting numerous users and/or other request sources to develop and transmit message request data object and/or information associated with message request data objects to message object control system 102.

As shown in FIG. 1, system environment 100 also includes event perception content system 106, which comprises a perception content module 106A, a perception content server 106B, and a perception content system database 106C. While only one event perception content system 106 is depicted in FIG. 1 in the interest of clarity, it will be appreciated that numerous additional such systems may be present in system environment 100, permitting numerous sources of event perception content to communicate and/or otherwise interact with the message object control system 102 and/or one or more request source systems 104. As shown in FIG. 1, the event perception content system 106 is capable of communicating with message object control system 102 to provide information that the message object control system 102 may need when predicting how an individual (such as a user associated with a request source system and/or a message request data object, for example) may perceive a potential event. For example, event perception content system 106 may, such as via the capabilities and/or actions of the perception content module 106A, perception content system server 106B, and/or perception content system 106C, obtain and provide information associated with a user, such as social media and/or other user-generated content, user behavioral information (such as a user's Internet usage history, and/or other online and/or offline activities, for example), third-party-generated and/or other content associated with the user and/or any other information related to a user's potential event perception. Event perception content system 106 is also shown as optionally being capable of communicating with request source system 104. In some situations, such as when a given event perception content system 106 is associated with user-generated content and/or user behavior content, it may be advantageous for the event perception content system to interface with and/or otherwise be in communication with the request source system 104 in general and the request source device 104B in particular to capture and/or otherwise object such content.

Overall, and as depicted in system environment 100, message object control system 102 engages in machine-to-machine communication with request source system 104 and event perception content system 106, via one or more networks, to facilitate the processing of message request data objects received from a user, the prediction of the user's perception of one or more potential events, the retrieval and/or generation of a user-specific digital content item set based at least in part on the message request data object at the predicted perception, and the generation and/or transmission of a control signal causing a renderable object associated with the user-specific digital content item set to be displayed on a user interface of a client device associated with the user.

Example Apparatus for Implementing Embodiments of the Present Invention

It will be appreciated that the message object control system 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, event and event perception categorization circuitry 210, and message customization circuitry 212. The apparatus 200 may be configured to execute any of the operations described herein, including but not limited to those described in connection with FIG. 1, FIG. 3, FIG. 4, and FIG. 5.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include input/output circuitry 206, such as a user interface that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication circuitry 208. The communication circuitry 208 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As shown in FIG. 2, the apparatus may also include event and event perception categorization circuitry 210. The categorization circuitry 210 includes hardware configured to maintain, manage, and provide access to a categorization database. The categorization circuitry 210 may provide an interface, such as an application programming interface (API), which allows other components of a system to obtain information associated with one or more events and/or information associated with the likely perception of an event by a user. For example, with respect to events, the categorization circuitry 210 may facilitate access to and/or processing of information regarding various events and/or classes of events, including but not limited to information regarding occurrences, probabilities, locations, causes, responses, effects, and/or other factors associated with such events and/or correlations between such aspects and factors. With respect to event perceptions, the categorization circuitry 210 may facilitate access to and/or processing of any information associated with a user's likely perception of and/or response to a potential event, including but not limited to any of the information that may be obtainable from and/or otherwise associated with an event perception content system 106.

The categorization circuitry 210 may facilitate access to the event and/or event perception information through the use of applications or APIs executed using a processor, such as the processor 202. However, it should also be appreciated that, in some embodiments, the categorization circuitry 210 may include a separate processor, specially configured field programmable gate array (FPGA), or application specific interface circuit (ASIC) to manage the access and use of the event and/or event perception data. The categorization circuitry 210 may also provide interfaces allowing other components of the system to add or delete records to the categorization database, and may also provide for communication with other components of the system and/or external systems via a network interface provided by the communications circuitry 208. The categorization circuitry 210 may therefore be implemented using hardware components of the apparatus configured by either hardware or software for implementing these planned functions.

The message customization circuitry 212 includes hardware configured to manage, store, process, and analyze a message request data object, the digital content items that may be provided in response to a request contained in a message request data object, and the information associated with a user's predicted perception of a potential event. Because the digital content items that may be provided in response to a message request data object may change frequently and/or be subject to control by other systems, it may be desirable to maintain a message customization database separate from the categorization database managed by the categorization circuitry 210 as described above. It should also be appreciated though, that in some embodiments the categorization circuitry 210 and the customization circuitry 212 may have similar and/or overlapping functionality. For example, both the message customization circuitry 212 and the event and event perception categorization circuitry 212 may interact with one or more data objects associated with a user's predicted perception of an event. In another example, the message customization circuitry may ascertain and/or recognize that certain digital content items have been previously presented to a given user, and such presentation history may be provided and/or otherwise shared with the categorization circuitry for incorporation with event perception information. The customization circuitry 212 may also provide access to other historical message information, such as response and/or selection rates associated with particular digital content items and/or aggregated records identifying which digital content items may be relevant to particular users and/or groups of users.

Example Processes for User-Specific Perception Prediction and Content Generation FIG. 3 is a block diagram showing an example data flow 300 that may be used in connection with the prediction of a user's perception of and/or response to one or more potential events and the generation of a user-specific digital content item set that may be provided to a user in response to the receipt of a message request data object from the user. As shown in FIG. 3, a perception prediction and content correlation manager 302 is configured to receive a message request data object from a user via a user request object interface 304. The user request object interface 304 may be implemented as discrete interface capable of passing message request data objects to the perception and content correlation manager 302 and/or may be incorporated into a message object control system 106, an implementation of the apparatus 200, and/or another system component. It will be appreciated that the precise implementation of the user request object interface 304 and its interactions with the perception prediction and content correlation manager 302 will vary depending on the particulars of the situation, context, and system environment in which users convey message requests to such elements.

In some example implementations, upon receipt of a message request data object via the user request object interface 304, the perception prediction and content correlation manager 302 may extract from the receive message request data object a user identification set and a request data set. In some such example implementations, the user identification set may include information that can be used by the perception prediction and content correlation manager 302 and/or another system element to identify a particular user. For example, such identification information may include an authenticated indication of the identity of a user such as confirmed user name and/or unique identification number that has been previously associated with a particular user. In some example implementations, the request data set may include a non-specific request for additional information about preparation and/or planning for one or more potential events. In other example implementations, the request data set may include more particularized and/or specific queries regarding resources and/or services that may be used in connection with the preparation for one or more specific types of potential events.

The perception prediction and content correlation manager 302 is also configured to take as inputs digital content item sets from the message text repository 306 and selectable option repository 308. Some example implementations of embodiments of the invention are directed to providing a user a particularized communication in the form of user-specific digital content item set that responds to a request received from a user in a manner that reflects the user's likely perception of and/or response to one or more potential events. Some such example implementations involve the generation of user specific digital content item sets that include both human readable text and/or other human-perceivable message content (such as still and/or video images, audio content and/or other digital content) and user-selectable options that may, for example reflect resources, services, and/or other content that a user may choose to access and/or evaluate as potential option associated with the user's request. In some example implementations, the digital content item sets incorporate and/or use pre-drafted template messages. In some instances of such implementations, the template messages may be configured to be customized based on information associated with the user. In some alternative embodiments, natural language generation techniques are used to develop user-specific messages and/or other items for inclusion in a digital content item set based on user-specific information obtained by the perception prediction and content correlation manager 302.

The perception prediction and content correlation manager 302 is also shown in FIG. 3 as being configured to take as inputs data objects from a wide range of data repositories 310A-310N. In general, these data repositories are configured to provide data objects to the perception prediction and content correlation manager 302 that provide information that may be used to predict a user's likely perception of and/or response to one or more events. In some example implementations, each of the data repositories 310A-310N may be implemented in connection with and/or otherwise incorporated into one or more event perception content systems 106. However, it will be appreciated that any other approach to providing a data repository that may be accessed by a perception prediction and content correlation manager 302 and/or a related system (such as a message object control system 102, for example) may be used in connection with example implementations of data flow 300.

As shown in FIG. 3, data repository 310A is a user context data repository. In some example implementations, user context data repository 310 is configured to and otherwise capable of providing a user context data object to the perception prediction and content correlation manager 302. Data repository 310B is shown in FIG. 3 to be a user event perception profile repository, and may be configured to and otherwise capable of providing an event perception data object to the perception prediction and content correlation manager 302. Data repository 310C is shown in FIG. 3 to be an event data repository, and may be configured to and otherwise capable of providing an event probability data object to the perception prediction and content correlation manager 302. It will be appreciated the labels and aspects of the data repositories 310A-310N may vary in example implementations based on the types of data available for use in connection with predicting a user's perception of and likely response to a potential event.

In some example implementations of data flow 300, the perception prediction and content correlation manager 302 may employ machine learning or a trainable model such that, over time, the perception prediction and content correlation manager 302, through receiving a plurality of user confirmations, may improve the determination of a prediction of a user's perception of a potential event and the determination of a digital content item set that responds to a request received from the user in a manner that incorporates and/or is informed by the predicted event perception, and the like.

In some embodiments, perception prediction and content correlation manager 302 may determine the prediction of the user's perception of a potential event by analyzing one or more sources of data associated with the user. By way of example, user-generated content (such as material posted by the user on social media sites and/or published online and/or in other fora, for example), user behavioral data (such as Internet usage history and/or other detected behavioral data), user-associated data (such as third-party text, images, and/or other content that reference the user and/or similar individuals) and/or other information may be combined and otherwise processed by the model to ascertain how a user may perceive and/or respond to a given event. The perception prediction and content correlation manager 302, via instructions executed by a processor associated with the perception prediction and content correlation manager 302, may determine that a particular digital content item set should be presented to the user in response to a message request previously transmitted by the user.

In some further embodiments, perception prediction and content correlation manager 302 may employ machine learning, or equivalent technology to improve future determinations of a user's predicted perception of a potential event. In some examples, perception prediction and content correlation manager 302 may generally provide a trained model that is given a set of input features, and is configured to provide an output of a score (such as a reliability score, for example), a recommendation, or the like. In some embodiments, a trained model can be generated using supervised learning or unsupervised learning. In some examples, such learning can occur offline, in a system startup phases, or could occur in real-time or near real-time during performing the methods shown in the described figures (e.g., predicting a user's likely event perception). The trained model may comprise the results of clustering algorithms, classifiers, neural networks, ensemble of trees in that the trained model is configured or otherwise trained to map an input value or input features to one of a set of predefined output scores or recommendations, and modify or adapt the mapping in response to historical data returned from previous iterations (e.g., selections and/or use of digital content item sets generated based on the predicted event perception).

Alternatively or additionally, the trained model may be trained to extract one or more features from historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data. In some examples, the historical data may comprise data that has been generated using user input, crowd based input or the like (e.g., user confirmations).

In some examples, the perception prediction and content correlation manager 302 may be configured to apply a trained model to one or more inputs to identify a set of reliability scores. For example, if the input feature was user location data, such as may be obtained from a mobile device, the perception prediction and content correlation manager 302 may apply the location data to the trained model to determine whether the location data is accurate. In some examples, the trained model would output a suggested reliability score based on other mobile devices that had the same location data.

Regardless of the precise configuration of the perception prediction and content correlation manager 302, upon receipt of a message request data object (and any necessary extraction or parsing of user identification and/or request data contained therein) the perception prediction and content correlation manager 302 retrieves and/or otherwise receives one or more data objects from the repositories 310A-310N and determines the user's predicted perception of and/or response to a given potential event and/or group of events. The perception prediction and content correlation manager 302 also retrieves and/or otherwise receives digital content item sets from the message text repository 306 and/or the selectable option repository 308 and, based on the predicted user event perception and the content of the message request data object, selects a digital content item set that is particularized to the user, and generates as output the user-specific message content 312 which includes at least the selected digital content item set.

In some example implementations of data flow 300, one or more of the data repositories 310A-310N may draw from a wide variety of underlying data sources. In FIG. 4A, an example data flow associated with an event data repository 310C is shown as allowing the event data repository 310C to receive information from a range of sources 404A-404N (which may include for example, a real time event data source 404A, an historical event data source 404B, an emergency service event data source 404C, and or any other event data source or sources 404N), which themselves may be processed by an event data manager 402. In some example implementations, the event data manager 402 is configured to apply one or more data processing algorithms or protocols (such as key word detection and/or analysis, contextual analysis, and the like, for example) to convert information received from the various sources 404A-404N (which may include disparate and/or otherwise incompatible data sets) into a format that may be readily stored by the event data repository 310C and/or otherwise provided as a data object to the perception prediction and content correlation manager 302 and/or another model for processing.

In FIG. 4B, an example data flow associated with a user event perception profile repository 310B is shown as allowing the user event perception profile repository 310B to receive information from a range of sources 408A-408N (which may include for example, a user-generated content source 408A, user behavioral data source 408B, user-associated content source 404C, and or any other user perception data source or sources 404N), which themselves may be processed by user event perception profile manager 406. In some example implementations, user event perception profile manager 406 is configured to apply one or more data processing algorithms or protocols (such as key word detection and/or analysis, contextual analysis, and the like, for example) to convert information received from the various sources 408A-408N (which may include disparate and/or otherwise incompatible data sets) into a format that may be readily stored by the user event perception profile repository 310B and/or otherwise provided as a data object to the perception prediction and content correlation manager 302 and/or another model for processing.

Some example implementations of embodiments of the invention described and otherwise disclosed herein are particularly advantageous in situations and contexts that involve event preparedness and planning. In some such situations, an individual may wish to incorporate insurance coverage (including but not limited to additional insurance coverage) into their event preparedness plans. Some example implementations arising in such situations involve offering personalized, additional, flexible, defined benefit or flat fixed payout type flood insurance coverage to individuals with existing flood coverage through the use of predictive analytics and machine learning. For example, an insured individual's geographic location, existing coverage information, policyholder demographic information and internet and social media activity patterns may be intersected together and/or with other information (such as historical flood data, public records, and/or other flood data compilations, for example) in a continuous learning algorithm to predict insurance benefit levels, target marketing messaging, event probabilities, and/or likely individual event perceptions. Additional flood insurance coverage may be offered in an individualized manner and may be used to cover any gaps in an existing flood insurance policy, including but not limited to gaps that may exist between existing coverage and the customer's likely perception of the severity of a given flooding event. Such coverage gaps may be highlighted to a user (such as via a web interface and/or at a point of sale, for example) based on predictive analytics. Moreover, the coverage amount to be offered to a user (such as at a point of sale, for example), and other aspects of one or more coverage offers may also be determined using predictive analytics.

With reference to FIGS. 3, 4a, and 4b, a customer of an insurance company may interact with an interactive portion of an insurance company's website and/or mobile application that functions as a user request object interface. As part of this interaction, the customer may convey a message request data object reflecting a request for additional information about supplemental insurance coverage associated with a flood and/or other event. Upon receipt of the message request data object via the user request object interface 304, the perception prediction and content correlation manager 302 may extract information from the message request data object. In some example implementations, this extracted information may take the form of a user identification data set (which may include, for example, a unique customer identifier, an authenticated indication of the identity of the user, and/or other information that identifies the user to the perception prediction and content correlation manager 302 (and, for example, the insurance company and/or other service provider associated with the perception prediction and content correlation manager 302). In some example implementations, the extracted information may also contain a request data set, which may reflect and/or otherwise convey the nature and scope of the inquiry made by the customer with respect to the supplemental insurance coverage and/or other services and/or resource requested by the user.

Once the perception prediction and content correlation manager 302 has extracted the relevant information from the customer's message request data object, the perception prediction and content correlation manager 302 may request and receive any of a number of data objects related to the user and/or the user's likely perception of one or more events from the data repositories 310A-310N. In some example implementations, one such data repository is the user context data repository 310A that is capable of providing a user context data object. In example implementations that arise in the context of a customer requesting information about additional and/or supplemental insurance coverage, the customer may have a preexisting relationship with the insurance company and/or other entity associated with the perception prediction and content correlation manager 302. As such, the user context data object may be a user-specific data object that is associated with the user identification set extracted from the message request data object. For example, the extracted user identification set may include a customer identification number. The perception prediction and content correlation manager 302 may pass this customer identification number (or, for example, an authentication token and/or other authenticated indication of the identity of the customer) to the user context data repository 310A. In response, the user context data repository 310A may retrieve the customer records associated with the customer and incorporate those records into a user context data object.

In some example implementations, the user context data object may include a geographic parameter set. A geographic parameter set may include one or more indications of a user-specific geographic location, such as an address for property held by the customer, locations that the customer is known to frequent, topological and/or other geographic data associated with the user, and/or other information associated with geographic locations where the customer lives, works, frequents and/or otherwise associates with. In some example implementations, the user context data object may include a user history parameter set. A user history parameter set may include a set of data associated with prior interactions between a customer and an entity associated with the perception prediction and content correlation manager 302. For example, a customer's existing coverage information and/or customer history information may be retrieved by the user context data repository 310A and incorporated into the user context data object. In some example implementations, the user context data object may include a user biographical parameter set. A user biographical parameter set may include a set of traits that are each associated with the customer. For example, the set of traits may include the customer's name, age, demographic information, education and/or work history, and/or other biographical information associated with the customer. This information may be retrieved by the user context data repository 310A and incorporated into a user context data object.

Another data repository that may supply a data object is the user event perception profile repository 310B that is capable of providing an event perception data object. In example implementations that arise in the context of a customer requesting information about additional and/or supplemental insurance coverage, and where the identity of the customer has be determined via the user identification data set, the perception prediction and content correlation manager 302 may pass the customer identification information to the user event perception profile repository 310B. In response, the user event perception profile repository 310B may retrieve user-specific event perception information associated with the customer and incorporate those records into an event perception data object.

In some example implementations, an event perception data object may include a user-specific event perception profile based at least in part on a user-generated content set and a user behavior set. In the context of a customer requesting information about additional and/or supplemental insurance coverage, some example implementations involve collecting information that is indicative of how a user may perceive a particular event (such as the severity and/or impact of one or more flood events, for example) and the compilation of such information into a user-specific event perception profile. With reference to FIG. 4B, a wide range of information may be relevant to the development of such a user-specific profile. For example, the profile may include user-generated content, such a text, images, and/or other content that the user posts on social media sites and/or otherwise publishes online and/or offline. Another example of information that may be incorporated into the user-specific profile is a user's Internet search history, which may, for example, provide one or more indications of how a user tends to perceive and/or remediate property damage and/or the other results of floods and/or other events. Another example of information that may be included in the user-specific profile is user-associated content, which may include, for example, content that references the user that appears on other web sites or other sources (such as posts made by a user's social media contacts, news articles and/or publications discussing and/or referencing the user, and/or public records associated with the user, for example).

It will be appreciated that the information generated by and/or otherwise associated with the user may take a wide variety of disparate forms and formats, particularly in situations where data sources are not typically compatible with and/or otherwise associated with other data sources. To that end, and as shown in FIG. 4B, some example implementations involve the use of a user event perception profile managed 406 and/or other device to analyze and/or otherwise process the raw data received from the various content sources (such as those depicted as elements 408A-408N in FIG. 4B) into a format that can be incorporated into an event perception data object and/or otherwise used by a user event perception profile repository. In some example implementations such processing and analysis may involve determining a risk tolerance associated with the user and the incorporation of such risk tolerance into a user-specific event perception profile.

In some example implementations, the user event perception profile manager 406 and/or the user event perception profile repository 310B may process and/or otherwise take into account information associated with a location and/or one or more changes of location associated with a particular user. For example, by accessing and/or using location services available to user's mobile device, a user's current location, frequently visited locations, travel pathways, and/or other location or geographic information may be ascertained and subsequently incorporated into a prediction of how a user may perceive a particular event. In some example implementations location services associated with a mobile device may take the form of global positioning system (GPS) information, triangulation locations, location information associated with network access points used by the mobile device and/or other approaches to determining and identifying one or more locations associated with a mobile device. Moreover, historical information regarding a user's locations may be ascertained and used. A user's past residency information and/or other information about locations where a user has lived, worked, and/or otherwise visited may provide useful information regarding how a user may perceive a given event.

Another data repository that may supply a data object is the event data repository 310C that is capable of providing an event probability data object. In example implementations that arise in the context of a customer requesting information about additional and/or supplemental insurance coverage, and where a request data set has been extracted from a message request data object, the perception prediction and content correlation manager 302 may pass the request data set (and, in some examples, the customer identification information) to the event data repository 310C. In response, the event data repository 310C may retrieve event information and/or other event records related to the request may by the user and incorporate those records into an event probability data object.

In some example implementations, an event probability data object may include a set of indications of a plurality of potential events and a set of probabilities of the occurrence of each potential event within the plurality of potential events. In the context of a customer requesting information about additional and/or supplemental insurance coverage, some example implementations involve collecting information that is indicative of the likelihood that various flood events may occur, the severity of such flood events and related outcomes. With reference to FIG. 4A, a wide range of information may be relevant to identifying potential flood events, the relative severity of such flood events, the probability that such events may occur, and the likely consequences of such flood events. For example, the historical event data (which may include historical records of flood events, flood footprint data, flood frequency data, and the like, for example) may be analyzed and processed (such as through the operation of an event data manager 402 and/or other processor) and incorporated into an event probability data object usable by the event data repository 310C. Real time and/or near-real time event data (such as contemporaneous weather reports, news records, social media posts, and/or other data sources, for example) may also be processed and incorporated into an event probability data object. Information associated with the emergency services, such as 911 and/or 411 call records, for example, may also be processed and incorporated into an event probably data object. It will be appreciated that in many example implementations, a location component will be incorporated into the event probability data object. For example, a location associated with a user, such as a particular structure, address, and/or other point of interest may be used to provide a geographic context within which other event probability information may be evaluated. As with the location information discussed herein with respect to user event perception profile repository, the geographic and/or other location information incorporated into an even probability data object may come from a wide variety of sources, such as a user's mobile device, records associated with the user (such as address information, recorded deeds, work history information, and the like, for example), and other indicia of the locations that are associated with a user and/or otherwise relevant to a determination of the probability of the occurrence of an event in or near a given area.

Upon receipt of the various data objects associated with a user, the user's potential perception of one or more events, and the event or events reflected in the user's message request, the perception prediction and content correlation manager 302 may apply the data objects to a first model, which, as discussed herein, may be a machine learning model capable of performing data analytics to predict a customer's likely perception of one or more flood events and/or other events. Based on the customer's message request and the predicted customer event perception, the perception prediction and content correlation manager 302 and/or the machine learning model incorporated therein may retrieve a user-specific digital content item set. With reference to FIG. 3, the perception prediction and content correlation manager 302 is capable of retrieving and/or otherwise receiving message objects and/or selectable option data objects from the message text repository 306 and the selectable option repository 308, respectively. The message objects may include, for example, text, images, and/or other content that may be presented to a user in response to the user's request for information about additional resources that may be used to address and/or remediate a flood event, and the selectable option data objects may include, for example, options that the customer may select via a user interface to elect one or more such additional resources (such as supplemental and/or additional insurance, for example) aimed towards addressing and/or remediating a flood event.

In some example implementations, retrieving a user-specific digital content item set may comprise using the machine learning model to generate a learned user profile. In some example implementations, the learned user profile includes a user-specific expected response set based at least in part on the received user context data object, the event probability data object, and the event perception data object, and may reflect one or more facets of a user's response to a flood event and may also, for example indicate the degree to which a user may be receptive to certain types of messages and/or selectable options.

Regardless of the form of the learned user profile, some example implementations involve applying the learned user profile to a plurality of potential messages (such as messages stored in and/or retrieved from the message text repository 306, for example) and applying the learned user profile to a plurality of user-selectable options (such as those options that may be stored in and/or retrieved from the selectable option repository 308, for example). In some example implementations, applying the learned user profile to the pluralities of potential messages and user-selectable options may involve the application of profile weights and/or other rules to associated with the learned user profile to score and rank each potential message and user-selectable option. Based on such scoring and ranking, one or more particular messages and/or user selectable options may be selected and incorporated into a digital content item set for presentation to the customer. For example, based on the user's profile, it may be determined that one or more particular additional coverage plans may be well-suited to addressing the concerns that a customer is likely to have with respect to a given flood event or type of flood event, and selectable options and messages associated with such coverage plans may be selected for presentation to the user.

Once the user-specific digital content item set has been determined and retrieved, the perception prediction and content correlation manager 302 and/or a communication interface associated therewith may generate a control signal causing a renderable object associated with the user-specific digital content item set to be displayed on a user interface of the client device associated with the user. In example implementations where the customer interacts with an insurance company system via a device (such as any of the example devices referenced herein with respect to the request source system 104, for example) a renderable object may be transmitted to the customer's device such that the message items and selectable options within the digital content item set can be displayed to and/or interacted with by the customer.

FIG. 5 is a flow chart of an example process 500 for predicting a user's perception of a potential event and, based on a request from the user and the predicted event perception, generating a user-specific digital content item set that may be provided to the user in response to the user's request. As shown at block 502, process 500 begins with receiving a message request data object from a user. The message request data object may incorporate a wide range of information and be expressed in any format that allows for the transmission of a message request data object from a system associated with a user, such a request source system 104, for example, to a machine learning model and/or a system associated with such a model. In general, a message request data object will incorporate information sufficient to identify a particular user and to identify a request made by the user.

As shown at block 504, process 500 continues with the extraction of a user identification data set and a request data set from the message request data object. As discussed herein, the user identification data set may include information sufficient to identify the user, such as an authenticated indication of the identity of a user, for example. In some example implementations, the request data set contains and/or reflects a user's request for information associated with one or more events (such as a request for additional information about resources and/or services that may be used in connection with planning and preparing for one or more events, for example).

In blocks 506, 508, and 510, the process 500 involves the receipt of a series of data objects, such as a user context data object, an event probability data object and an event perception data object. As discussed herein, these data objects may be applied to a machine learning model to enable the prediction of a user's perception of one or more events (such as a user's individualized, relativistic perception of the severity of a flood and/or other event, for example). As shown in block 512, process 500 also included using the machine learning model (such as through the application of the user-specific predicted perception, for example) to select a user-specific digital content item set. In some example implementations, the digital content item set may incorporate messages, selectable objects, and/or other content that may represent resources and/or other services that a user may opt to use in connection with event preparation and planning.

As shown at block 514, process 500 also includes causing a renderable object with the user-specific digital content item set to be displayed on a user device. In some example implementations, the renderable object may be transmitted to a user device and cause the messages, selectable options, and/or other content contained in the user-specific digital content item set to be presented to the user in a manner that allows the user to view and interact with the content.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus to:
    retrieve a user-specific digital content item set for a user comprising a first user-specific message, wherein retrieving the user-specific digital content item set comprises:
        generating, by a first model, a learned user profile by applying an event perception data object to the first model;
        applying the learned user profile to a plurality of potential messages;
        selecting the first user-specific message from the plurality of potential messages; and
        assigning the first user-specific message to the user-specific digital content item set; and
    generate a control signal causing a renderable object comprising the user-specific digital content item set to be displayed on a user interface of a client device associated with the user.

2. The apparatus of claim 1, wherein the event perception data object comprises a user-specific event perception profile based at least in part on a user-generated content set, the user-generated content set comprising data associated with one or more interactions between the user and one or more social media platforms.

3. The apparatus of claim 2, wherein the data associated with the one or more interactions between the user and the one or more social media platforms comprises text or image data.

4. The apparatus of claim 2, wherein the user-generated content set comprises user internet search history data.

5. The apparatus of claim 2, wherein the event perception data object comprises a user-specific event perception profile based at least in part on a user-associated content set, the user-associated content set comprising data associated with the user.

6. The apparatus of claim 5, wherein the data associated with the user comprises content data referencing the user on one or more electronic sources, the one or more electronic sources comprising one or more of a website, social media posts, news articles, publications, and/or public records.

7. The apparatus of claim 1, wherein the user-specific digital content item set further comprises a first user-selectable option set, and wherein retrieving the user-specific digital content item set further comprises:
    applying the learned user profile to a plurality of user-selectable options;
    selecting the first user-selectable option set from among a plurality of user-selectable options; and
    assigning the first user-selectable option set to the user-specific digital content item set.

8. The apparatus of claim 1, wherein applying the learned user profile to the plurality of potential messages comprises:
    determining a score for each potential message of the plurality of potential messages based on an application of profile weights associated with the learned user profile; and
    wherein the first user-specific message is selected from the plurality of potential messages based the first user-specific message having a score greater than each other potential message of the plurality of potential messages.

9. The apparatus of claim 1, wherein the user-specific digital content item set is retrieved in response to receiving a message request data object from the client device associated with the user.

10. The apparatus of claim 1, wherein applying the learned user profile to the plurality of potential messages comprises:
    ranking each potential message of the plurality of potential messages based on a rule set associated with the learned user profile; and
    wherein the first user-specific message is a highest ranked message of the plurality of potential messages.

11. A method comprising:
    retrieving a user-specific digital content item set for a user comprising a first user-specific message, wherein retrieving the user-specific digital content item set comprises:
        generating, by a first model, a learned user profile by applying an event perception data object to the first model;
        applying the learned user profile to a plurality of potential messages;
        selecting the first user-specific message from the plurality of potential messages; and assigning the first user-specific message to the user-specific digital content item set; and generating a control signal causing a renderable object comprising the user-specific digital content item set to be displayed on a user interface of a client device associated with the user.

12. The method of claim 11, wherein the event perception data object comprises a user-specific event perception profile based at least in part on a user-generated content set, the user-generated content set comprising data associated with one or more interactions between the user and one or more social media platforms.

13. The method of claim 12, wherein the data associated with the one or more interactions between the user and the one or more social media platforms comprises text or image data.

14. The method of claim 12, wherein the user-generated content set comprises user internet search history data.

15. The method of claim 12, wherein the event perception data object comprises a user-specific event perception profile based at least in part on a user-associated content set, the user-associated content set comprising data associated with the user.

16. The method of claim 15, wherein the data associated with the user comprises content data referencing the user on one or more electronic sources, the one or more electronic sources comprising one or more of a website, social media posts, news articles, publications, and/or public records.

17. The method of claim 11, wherein the user-specific digital content item set further comprises a first user-selectable option set, and wherein retrieving the user-specific digital content item set further comprises:

applying the learned user profile to a plurality of user-selectable options;

selecting the first user-selectable option set from among a plurality of user-selectable options; and assigning the first user-selectable option set to the user-specific digital content item set.

18. The method of claim 11, wherein applying the learned user profile to the plurality of potential messages comprises:

determining a score for each potential message of the plurality of potential messages based on an application of profile weights associated with the learned user profile; and wherein the first user-specific message is selected from the plurality of potential messages based the first user-specific message having a score greater than each other potential message of the plurality of potential messages.

19. The method of claim 11, wherein applying the learned user profile to the plurality of potential messages comprises:

ranking each potential message of the plurality of potential messages based on a rule set associated with the learned user profile; and wherein the first user-specific message is a highest ranked message of the plurality of potential messages.

20. A non-transitory computer-readable medium storing computer-executable instructions for:

retrieving a user-specific digital content item set for a user comprising a first user-specific message, wherein retrieving the user-specific digital content item set comprises:

generating, by a first model, a learned user profile by applying an event perception data object to the first model;

applying the learned user profile to a plurality of potential messages;

selecting the first user-specific message from the plurality of potential messages; and assigning the first user-specific message to the user-specific digital content item set; and generating a control signal causing a renderable object comprising the user-specific digital content item set to be displayed on a user interface of a client device associated with the user.

\* \* \* \* \*